Figure 1:
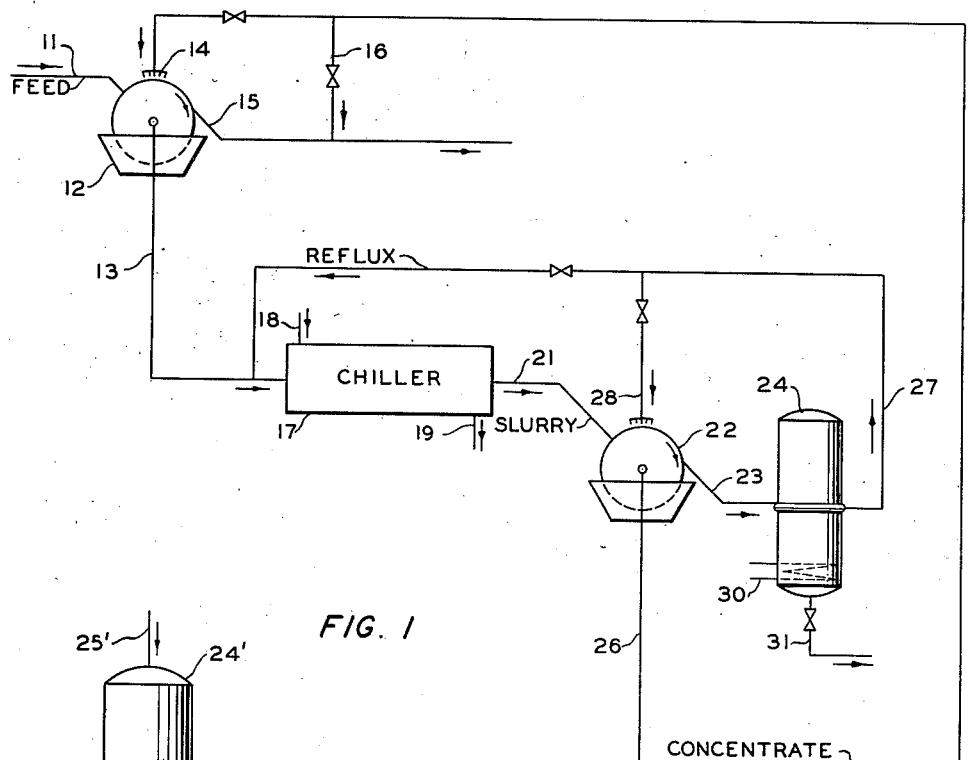

Dec. 3, 1957   D. L. McKAY   2,815,288
CRYSTAL PURIFICATION
Filed Sept. 4, 1953

INVENTOR.
D. L. MC KAY
BY *Hudson and Young*
ATTORNEYS

United States Patent Office 2,815,288
Patented Dec. 3, 1957

2,815,288

CRYSTAL PURIFICATION

Dwight L. McKay, Bartlesville, Okla., assignor to Phillips Petroleum Company, a corporation of Delaware Application September 4, 1953, Serial No. 378,638

13 Claims. (Cl. 99—205)

This invention relates to the separation of materials by means of partial solidification. In one of its more specific aspects, the invention relates to the concentration of juices. In another of its more specific aspects, it relates to the recovery of pulp, the concentration of sugars, and a reblending of the two streams.

Fractional crystallization has come into wide use as a method of separating materials which are difficult to separate by other known methods, such as fractional distillation or solvent extraction. Fractional crystallization has particular application in instances wherein the boiling points of the materials to be separated are very close. Furthermore, the other prior methods involve a series of operations in order to obtain products of high purity, whereas, in many cases, fractional crystallization produces materials of high purity in a single operation.

Fractional crystallization is applicable to processes, such as the concentration of food products. In the preparation of such concentrated foods, the processes consist generally of the removal of water from such products. One special class of foods which can be concentrated in this manner is that of the fruit juices such as grape, pineapple, watermelon, apple, orange, lemon, lime, tangerine, grapefruit, and the like. The process is also applicable to the concentration of vegetable juices, beverages such as milk and the like, by dehydration in a like manner. Unconcentrated fruit juice, generally having 5 to 15 weight percent sugar content, is concentrated so as to have a sugar content of from 40 to 50 percent, preferably 40 to 43 percent, by this process.

In the preparation of crystals, the feed material is ordinarily introduced directly into a chiller in which a portion of the material is crystallized. From this chiller, the material may be conveyed to a soaking zone where it is held for a period of time sufficient for the crystals to attain a size suitable for future operations including phase separation and crystal purification. Various types of crystal purification equipment are suitable for use in combination with the method of the present invention. Among the various types of crystal purification apparatus which can be used in this invention are those disclosed in Weedman application Serial Number 166,992, filed June 9, 1950 now Patent No. 2,747,001; Green application Serial Number 327,380, filed December 22, 1952 now Patent No. 2,765,921; and the apparatus of D. L. McKay application Serial Number 375,850, filed August 24, 1953.

Each of the following objects is attained by at least one of the aspects of this invention.

An object of this invention is to provide an improved fractional crystallization process. Another object of the invention is to provide an improved method for concentrating food products. Another object of the invention is to provide an improved method for concentrating fruit juices. Another object of the invention is to provide an improved two-step process for concentrating fruit juices. Other and further objects of this invention will be apparent upon study of the accompanying disclosure and the drawing.

Broadly speaking, this invention comprises the separation of normally solid materials, such as pulp, from food products, such as by filtering the normally liquid material from normally solid material of the food products while washing the normally solid material with a portion of concentrated liquid product. Normally liquid material and a portion of the concentrate recovered in this filtration step are passed to a chiller wherein the normally liquid material is partially solidified. A slurry of the solidified and unsolidified material is then passed to a second filtration step wherein the unsolidified material is recovered as a concentrated product and the crystallized or solidified material is passed through a crystal purification zone wherein a second substantially pure product, i. e., for example, water, is recovered. The concentrated product from the second filtration step is combined with the normally solid materials recovered in the first filtration step, a portion of the concentrate from the second filtration step being used as wash liquid for the first filtration step, if desired. By saturating the solids in the first filtration step with concentrate, the blending of solids and concentrate in a subsequent step is more easily controlled. Any ratio of solids and concentrate can be blended without having to consider the amount of unconcentrated juice occluded by the solids.

Figure 2:
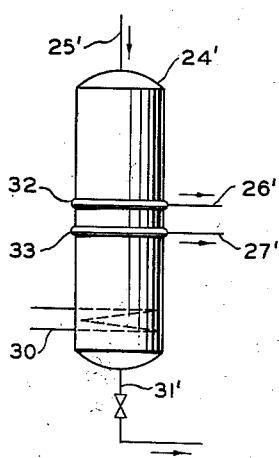

Better understanding of this invention will be obtained upon reference to the drawings in which Figure 1 is a schematic representation of the flow system of this invention; and Figure 2 is an elevation of a modified crystal purifier chamber.

Referring particularly to Figure 1 of the drawings, a food material, such as fruit juice, is passed by means of conduit 11 to a filter 12 wherein solid materials are deposited out on the surface of a filter and normally liquid material flows through the filter and is removed therefrom through conduit 13. Filter 12, as shown in the drawing, is preferably a rotatable porous drum rotated in a clock-wise direction. Concentrated liquid product is sprayed over the solids-coated porous drum by means of spray 14. The concentrated liquid product passes through the porous drum and is recovered, together with normally liquid material from the feed and is taken from the filter through conduit 13. Normally solid material is removed from the surface of the porous filter drum by means of scraper 15 and is co-mingled with concentrated liquid food product from filter 22, in conduit 16. The normally liquid material which is removed from filter 12 through conduit 13 is introduced into chiller 17 which is provided with cooling means such as cooling coils having inlets and outlets 18 and 19, respectively. A portion of the material from filter 12 is solidified or crystallized in chiller 17 and a slurry of crystallized and uncrystallized material is removed from chiller 17 through conduit 21 to filter 22.

The crystal-liquid mixture which is removed from chiller 17 is at a temperature sufficiently below the freezing or solidification point of the higher freezing constituent of the mixture to obtain a crystal slurry thereof. In the case of fruit juice, the temperature is about minus 1 to minus 25° C., preferably minus 15 to minus 20° C.

Filter 22, as shown in the drawing, also rotates in a clock-wise direction and crystallized material which is deposited on the surface of the rotatable porous drum of filter 22 is scraped from the surface of that drum by means of scraper 23 and is introduced into crystal purification column 24 by means of conduit 23. Uncrystallized material recovered from filter 22 is passed by means of conduit 26 to conduit 16 wherein it is mixed with the solids material recovered from filter 12, a portion of the stream from conduit 26 being passed to spray 14 as wash liquid for the first filter.

Crystallized material introduced into crystal purification column 24 is moved by any desired means, such as a porous or non-porous piston in the purification column, a screw conveyor, a positive displacement pump, by gravity or the like, toward a melting zone in one end thereof. Heat is applied to the melting zone by heat exchange means 30 positioned on the exterior or the interior of the melting zone section of column 24. At least a portion of the crystals is melted and such melt is passed, countercurrent to the movement of crystals, through the crystal mass as reflux. This reflux washes occluded materials from the crystals, and the reflux, together with occluded materials, is withdrawn from crystal purification column 24 through conduit 27. This stream of material is preferably returned to conduit 13 upstream of chiller 17, although, if desired, a small portion thereof may be passed through conduit 28 as wash liquid for the crystals in filter 22. Return of this stream directly to filter 22, however, has the disadvantage of diluting the concentrated product removed through conduit 26 though it can be used to obtain close control of the concentration of the product. A relatively pure product, such as water, is recovered from the melting zone end of crystal purification column 24 through conduit 31. This product may be recovered in the form of melt, in the form of crystals, or as a mixture thereof.

Referring particularly to Figure 2 of the drawings, a modified crystal purification column 24' is used, whereby it is possible to separate crystallized and uncrystallized material without the use of a separate filter such as filter 22, shown and discussed in connection with Figure 1. In the device shown in Figure 2 of the drawings, a slurry of the crystallized material in uncrystallized liquid is introduced into the upper end portion of purification column 24' through conduit 25'. As pointed out above, the crystals can be moved through this column by any desired means, such as a porous or non-porous piston, a screw conveyor, a positive displacement pump, by gravity, or the like. As the crystals move through column 24' as a compact mass, the uncrystallized liquid is separated from the crystals through filter 32 and conduit 26'. This material corresponds to the liquid removed from filter 22 through conduit 26 in the device shown in Figure 1 of the drawings. The crystal mass is moved through purification column 24' toward a melting zone which utilizes a heat exchanger, diagrammatically shown as coil 30, although this heat exchanger may be coils positioned inside of or outside of the melting section of column 24', may be electrical heating means around the sides or bottom of the melting zone or may be an electrical bayonet type heater extending upwardly through the interior of the melting zone. At least a portion of the crystalline material is melted in the melting zone, and a portion of the melt is passed countercurrently through the moving mass of crystals. This reflux removes occluded materials from the crystals, and the reflux stream, together with occluded materials, is removed from column 24' through filter 33 and conduit 27'. This stream corresponds to the stream removed from column 24 of Figure 1 through conduit 27. Pure product, which in the case of foods being dehydrated will be water, is removed from the downstream end portion of purification column 24', with respect to crystal movement, through conduit 31' as liquid material, crystalline material, or a mixture thereof.

As pointed out above, numerous types of crystal purification columns can be utilized in connection with this invention. In some instances, it may be desirable to utilize a column wherein a plurality of stirrer rods is utilized to maintain a uniform distribution of crystals throughout the column and thus prevent channeling of reflux liquid through the crystal mass. If desired, the chiller and the purification column can be one continuous chamber.

Although the device shown in Figures 1 and 2 of the drawings show a vertical type purification column with the flow of crystalline material being in a downward direction, it is within the scope of the invention to utilize either vertical, inclined, or horizontal purification columns, and the movement of crystals may be in either direction through the column as long as the melting zone is in the downstream end portion.

Various modifications of this invention will be apparent to those skilled in the art upon study of the accompanying disclosure. Such modifications are believed to be within the spirit and scope of this invention.

I claim:

1. The process of removing an undesired constituent from a multi-component, normally solids containing liquid material one component of which is crystallizable, which comprises separating said solids from said liquid material; chilling said liquid to crystallize one of its components; separating uncrystallized material as a concentrated product from said crystallized material; melting at least a portion of said crystals; washing said crystals with a portion of said melt so as to remove occluded materials therefrom; separating said wash liquid and occluded materials from said crystals; recovering said crystallized material as purified product; washing said solids separated from said liquid material with a portion of said uncrystallized material product; and combining the remaining portion of said uncrystallized material product with said solids as the concentrated total product of the process.

2. The process of concentrating a food material which contains water, a normally solid material in suspension, and a material soluble in said water which process comprises separating normally solid and normally liquid materials of said food material; chilling said normally liquid material so as to crystallize at least a portion of the water content thereof; separating uncrystallized material as a concentrated product from said crystallized water; washing said normally solid materials with a portion of said uncrystallized material product; and combining said washed normally solid material and said uncrystallized material product as a concentrated total product of the process.

3. The process of concentrating a multi-component, solids containing food product one component of which is water and one component is crystallizable which comprises separating normally solid and normally liquid materials of said food material; cooling said normally liquid material to crystallize water therein; separating crystallized and uncrystallized material; washing said normally solid material with a portion of said uncrystallized material; combining the remaining portion of said uncrystallized material with said normally solid material as the concentrated total product; recovering the portion of uncrystallized material used as a wash material and combining that material with the normally liquid material separated from said solids; passing said crystals through a crystal purification zone; melting at least a portion of said crystals in a melting zone of said crystal purification zone; passing at least a portion of said melt as reflux countercurrently through said crystals so as to dislodge occluded materials from said crystals; removing said occluded material and said reflux from said crystal purification zone; cooling said occluded material and reflux together with the normally liquid material separated from said normally solid material as hereinbefore described; and removing purified product from said crystal purification zone.

4. The process of concentrating fruit juice which comprises filtering pulp from said juice; chilling the depulped juice so as to crystallize water therein; separating uncrystallized juice from said crystallized water; washing said pulp with a minor portion of said uncrystallized juice; and combining said washed pulp and the remaining portion of said uncrystallized juice.

5. The process of claim 4 wherein said depulped juice is chilled to a temperature of from 1 to 25° C. below the solidification point of the water.

6. The process of claim 4 wherein said crystallized water is passed as a compact mass of crystals through a purification zone; melting at least a portion of said crystals in the downstream end portion of said purification zone; passing at least a portion of the resulting melt countercurrently through the compact mass of crystals in said purification zone so as to displace occluded materials from said crystals; removing a substantially pure water product from the downstream end portion of said purification zone; recovering said reflux and occluded materials from said purification zone; and subjecting said reflux, occluded materials, and wash portion of concentrated juice to chilling, together with said depulped juice.

7. The process of claim 6 wherein said fruit juice is orange juice.

8. The process of claim 6 wherein said fruit juice is lemon juice.

9. The process of claim 6 wherein said fruit juice is lime juice.

10. The process of claim 6 wherein said fruit juice is grapefruit juice.

11. The process of claim 6 wherein said fruit juice is grape juice.

12. A process for removing an undesired constituent from a multi-component, liquid material one component of which is crystallizable containing suspended normally solid material, which process comprises separating said normally solid material from said liquid material; crystallizing a component from said liquid material; separating uncrystallized material, as a concentrate, from the crystallized material; removing said crystallized material from the system; washing the normally solid material, separated as hereinbefore described, with a portion of said uncrystallized material; and combining the remaining portion of said uncrystallized material with said washed normally solid material to form the product of the process.

13. In a process wherein a juice comprising a pulp suspended in a liquid containing dissolved material is concentrated by separating said pulp from said liquid, concentrating the material dissolved in said liquid, and admixing thus concentrated material with said pulp, the improvement which comprises washing said pulp with a portion of said concentrated material and admixing the washed pulp with the remainder of said concentrated material.

References Cited in the file of this patent

UNITED STATES PATENTS

| | | |
|---|---|---|
| 2,187,572 | Meinzer | Jan. 16, 1940 |
| 2,221,993 | Oswald | Nov. 19, 1940 |
| 2,617,274 | Schmidt | Nov. 11, 1952 |
| 2,651,665 | Booker | Sept. 8, 1953 |
| 2,657,555 | Wenzelberger | Nov. 3, 1953 |
| 2,665,316 | Bennett | Jan. 8, 1954 |
| 2,695,323 | Arnold | Nov. 23, 1954 |